United States Patent
Nishida et al.

(10) Patent No.: US 6,915,637 B2
(45) Date of Patent: Jul. 12, 2005

(54) GAS TURBINE COMBUSTOR

(75) Inventors: Koichi Nishida, Hyogo (JP); Katsunori Tanaka, Hyogo (JP); Wataru Akizuki, Hyogo (JP); Sadao Minagawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/790,122

(22) Filed: Mar. 2, 2004

(65) Prior Publication Data

US 2004/0163392 A1 Aug. 26, 2004

Related U.S. Application Data

(62) Division of application No. 10/178,720, filed on Jun. 25, 2002, now Pat. No. 6,772,594.

(30) Foreign Application Priority Data

Jun. 29, 2001 (JP) .......................................... 2001-199944

(51) Int. Cl.[7] .................................................. F02C 1/00
(52) U.S. Cl. .......................................... 60/737; 60/746
(58) Field of Search ........................... 60/737, 746, 747; 431/174

(56) References Cited

U.S. PATENT DOCUMENTS

| 5,596,873 A | 1/1997 | Joshi et al. |
| 5,836,164 A | 11/1998 | Tsukahara et al. |
| 6,038,861 A | 3/2000 | Amos et al. |
| 6,068,467 A | 5/2000 | Mandai et al. |
| 6,082,111 A | 7/2000 | Stokes |

FOREIGN PATENT DOCUMENTS

| EP | 1 103 767 | 5/2001 |
| JP | 7-248118 | 9/1995 |
| JP | 8-28871 | 2/1996 |

OTHER PUBLICATIONS

Y. Kinoshita, et al., pps 53–61, "Research on Low $NO_x$ Combustion Technique in HYPR Project", Dec. 14, 1999 (with English Translation).

Primary Examiner—Michael Koczo, Jr.
(74) Attorney, Agent, or Firm—Oblon, Spivak, McClelland, Maier & Neustadt, P.C.

(57) ABSTRACT

A gas turbine combustor is provided with a nozzle extension tube having an inclination outward in a diameter direction of a combustor inner cylinder and in a peripheral direction of the combustor inner cylinder. As a result, the premixed gas is transformed to a spiral flow passing into a combustion chamber while turning, i.e., an outward turning flow, thereby sufficiently mixing the premixed gas while the premixed gas is flowing in the combustion chamber.

2 Claims, 15 Drawing Sheets

PRIOR ART

GAS TURBINE COMBUSTOR

FIELD OF THE INVENTION

This invention relates to a gas turbine. More specifically, this invention relates to a gas turbine combustor which can reduce the generation of $NO_x$ during the operation of the gas turbine.

BACKGROUND OF THE INVENTION

A diffusion combustion system, in which fuel and the air are ejected from different nozzles and burned, has been often used for conventional gas turbine combustors. Recently, however, a premix combustion system which is more advantageous in the reduction of thermal $NO_x$ has been also used inplace of the diffusion combustion system. The premix combustion system means that fuel and the air are premixed with each other and the mixture is ejected from the same nozzle and burned. According to this combustion system, even if fuel is rarefied, it is possible to burn the fuel in that state in any combustion regions. Therefore, it is easy to decrease the temperature of the premixed fuel, and this premix combustion system is advantageous in the reduction of $NO_x$ as compared with the diffusion combustion system. On the other hand, this premix combustion system has the following problem, that is, the stability of a combustion state is inferior because the air is excess with respect to the fuel and the temperature of premixed flames is low.

FIG. 16 is a front view which shows one example of a premix type gas turbine combustor. A combustor inner cylinder 20 is provided in a combustor outer casing 10 at a constant clearance kept between the cylinder and the casing. A diffusion flame formation cone 30 which forms diffusion flames is provided on the central portion of the combustor inner cylinder 20. The diffusion flame formation cone 30 causes pilot fuel supplied from a pilot fuel supply nozzle 31 to react with the air supplied from the portion between the combustor outer casing 10 and the combustor inner cylinder 20, and forms diffusion flames.

Although it is not clear from FIG. 16, eight premixed flame formation nozzles 40 which form premixed flames are provided around the diffusion flame formation cone 30. Premixed gas is formed by mixing the air supplied from the portion between the combustor outer casing 10 and the combustor inner cylinder 20 with main fuel and then ejected from the premixed flame formation nozzles 40. The premixed gas ejected from the premixed flame formation nozzles 40 is passed through premixed flame formation nozzle extension tubes 400 provided at the outlets of the nozzles 40, respectively and ejected toward a combustion chamber 50. This premixed gas is ignited by high-temperature combustion gas discharged from the diffusion flames and forms premixed flames. High-temperature, high-pressure combustion gas is discharged from the premixed flames, passed through a combustor tail pipe (not shown) and then introduced into the first stage nozzle of a turbine.

In the meantime, in the gas turbine combustor, the premixed gas is ejected linearly from the premixed flame formation nozzle extension tubes 400 toward the combustion chamber 50, and therefore uneven fuel concentration portions exist in the premixed gas. Therefore, combustion temperature is high on the portions of the premixed gas on which the fuel concentration is high and $NO_x$ tends to be generated on the portions. To solve this problem and to suppress further generation of $NO_x$ in the premix type gas turbine combustor, it is necessary to sufficiently mix the main fuel with combustion air. From this viewpoint, Japanese Patent Application Laid-Open (JP-A) No. 7-248118 discloses a premix combustor which is provided with a premix unit consisting of a group of cylindrical members which generate turning flows of the combustion air in a premix combustor. In addition, JP-A No. 8-28871 discloses a gas turbine combustor which is provided with units which respectively turn premixed gas in a peripheral direction so that a plurality of turning flows of the premixed gas are wound around one another or twisted into one another in the combustor.

However, in each of the gas turbine combustors disclosed in the JP-A Nos. 7-248118 and 8-28871, the premixed gas is transformed to turning flows directing inward in the direction of the center of a combustion chamber and twisted, and thereby a combustion gas recycle region cannot be sufficiently formed. Therefore, these gas turbine combustors have disadvantages in that the flame holding of the premixed flames become unstable and stable combustion cannot be thereby obtained and that oscillating combustion and the like are caused. Further, since the premixed gas is concentrated in the neighborhood of the center of the combustion chamber and combusted, local high-temperature portions tend to be generated and the generation of $NO_x$ cannot be sufficiently suppressed.

SUMMARY OF THE INVENTION

It is an object of this invention to provide a gas turbine combustor which can reduce the generation of $NO_x$ during the operation of a gas turbine and which can stably combust gas.

The gas turbine combustor according to one aspect of this invention comprises a combustor inner cylinder, and a diffusion flame formation cone which is disposed inside of the combustor inner cylinder and which forms diffusion flames by mixing pilot fuel with air. The gas turbine combustor also comprises a premixed flame formation nozzle which is provided annularly between the combustor inner cylinder and a pilot flame formation cone and which forms premixed flames out of premixed gas formed by mixing main fuel with the air. The gas turbine combustor further comprises a premixed flame formation nozzle extension section which is disposed at an outlet of the premixed flame formation nozzle and which forms a flow of premixed gas turning in a peripheral direction of the combustor inner cylinder while being directing outward in a diameter direction of the combustor inner cylinder.

The gas turbine combustor according to another aspect of this invention comprises a combustor inner cylinder, and a diffusion flame formation cone which is disposed inside of the combustor inner cylinder and which forms diffusion flames by mixing pilot fuel with air. The gas turbine combustor also comprises a premixed flame formation nozzle which is provided annularly between the combustor inner cylinder and a pilot flame formation cone and which forms premixed flames out of premixed gas formed by mixing main fuel with the air. The gas turbine combustor further comprises a premixed flame formation nozzle extension section which is disposed at an outlet of the premixed flame formation nozzle while being inclined outward in a diameter direction of the combustor inner cylinder and in a peripheral direction of the combustor inner cylinder with respect to an axial direction of the combustor inner cylinder, and which ejects premixed gas formed at the premixed flame formation nozzle.

The gas turbine combustor according to still another aspect of this invention comprises a combustor inner cylinder, and a mixed gas formation cylinder which has a nozzle ejecting pilot fuel and a nozzle ejecting main fuel and which is disposed inside of the mixed gas formation cylinder. The gas turbine combustor also comprises a mixed gas ejection extension section which is disposed at an outlet of the mixed gas formation cylinder while being inclined outward in a diameter direction of the combustor inner cylinder and in a peripheral direction of the combustor inner cylinder with respect to an axial direction of the combustor inner cylinder, and which ejects gas formed by mixing the pilot fuel with air and premixed gas formed by mixing the main fuel with the air.

Other objects and features of this invention will become apparent from the following description with reference to the accompanying drawings.

DETAILED DESCRIPTIONS

This invention will be described hereinafter in detail with reference to the drawings. It is noted that this invention should not be limited to the following embodiments. It is also noted that constituent elements in the embodiments to be described below include those which a person skilled in the art can easily assume.

A first embodiment of this invention will be explained below. In the first embodiment, this invention will be explained while taking up a case of attaching a premixed flame formation nozzle extension tube or the like to each premixed flame formation nozzle or the like and ejecting premixed gas toward a combustion chamber as an example. It is noted that a premixed flame formation nozzle extension section and a mixed gas ejection extension section according to this invention include not only a premixed flame formation nozzle extension tube or the like but also a case of extending the outlet of each premixed flame formation nozzle or the like to directly eject premixed gas or the like toward a combustion chamber.

Figure 1:
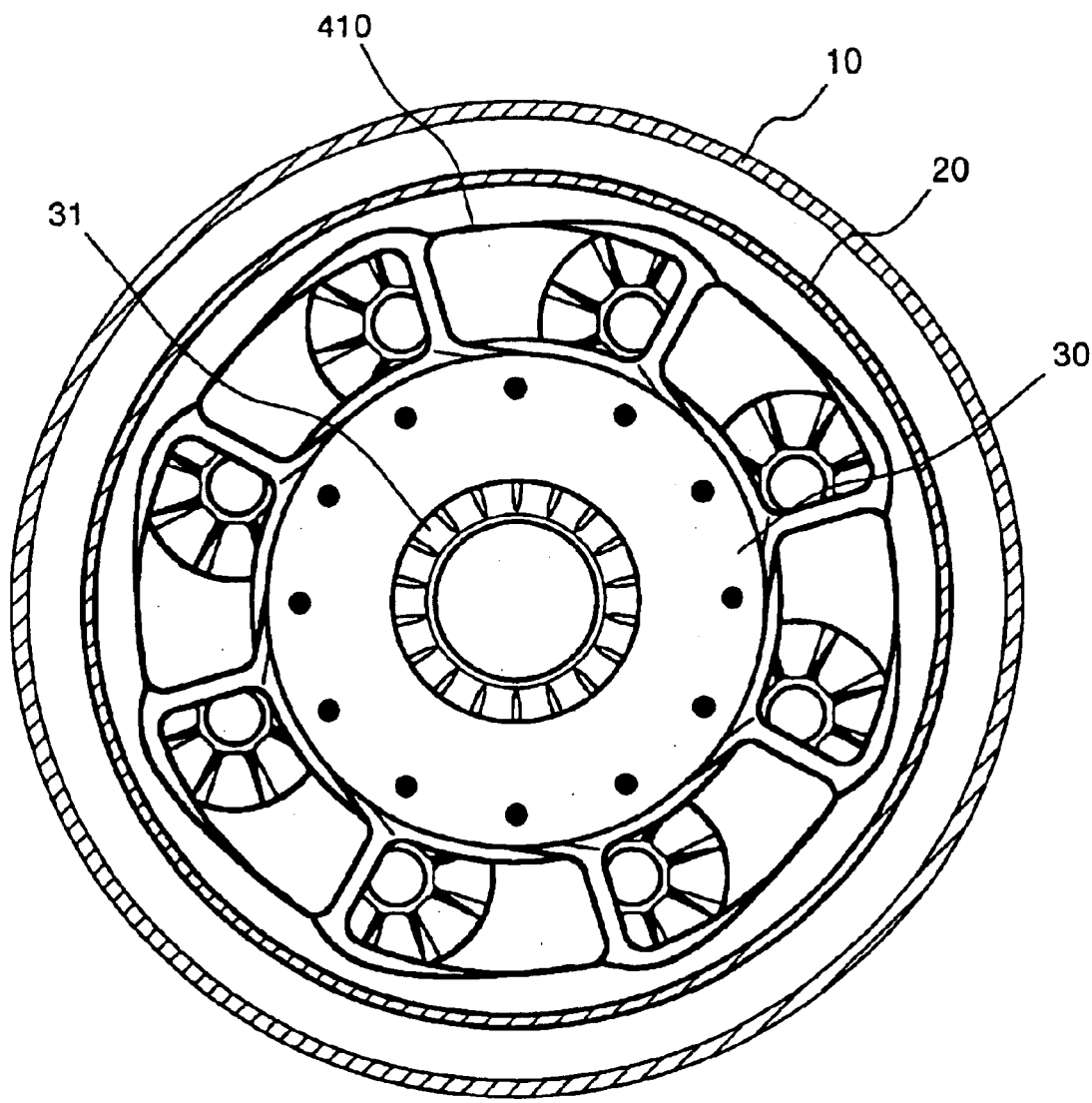
FIG. 1 is a front view of a gas turbine combustor according to a first embodiment of the invention.
Figure 2:
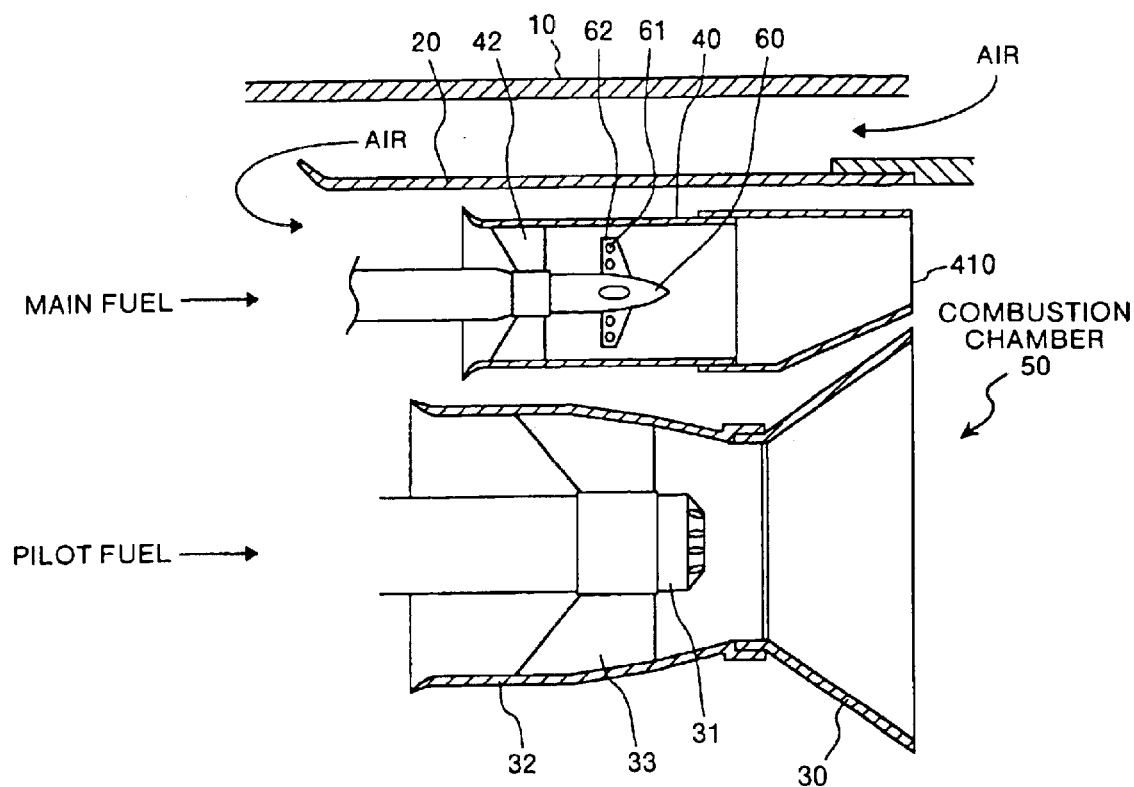
FIG. 2 is a cross-sectional view of the gas turbine combustor shown in FIG. 1, taken along an axial direction thereof.
Figure 3A:
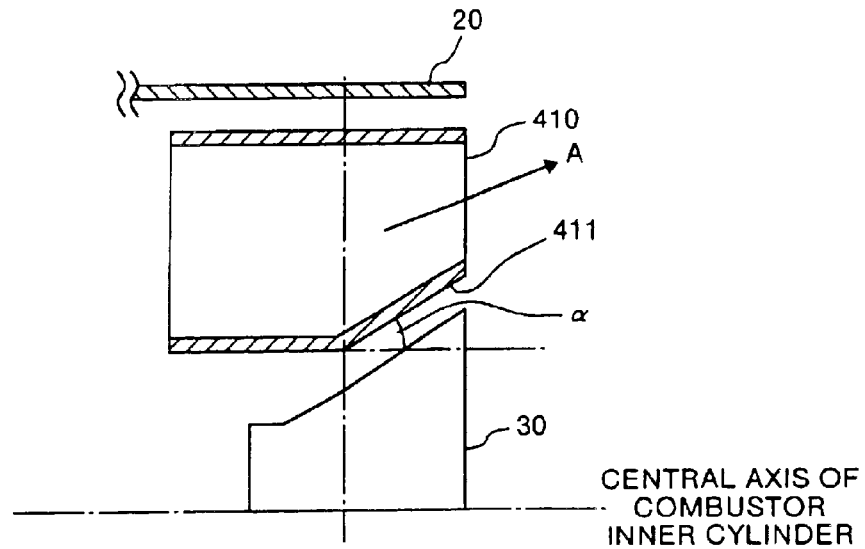
FIG. 3A and FIG. 3B show cross-sectional views of a premixed flame formation nozzle extension tube used in the first embodiment, taken along an axial direction thereof.
Figure 3B:
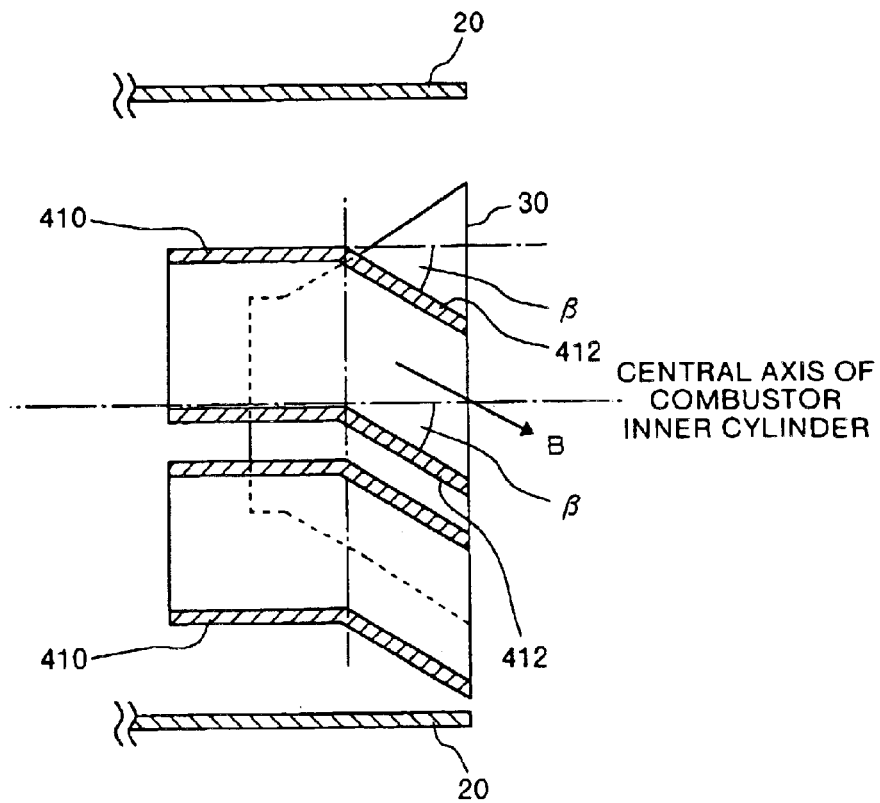

FIG. 1 is a front view of a gas turbine combustor according to the first embodiment. FIG. 2 is a cross-sectional view of the gas turbine combustor shown in FIG. 1, taken along an axial direction thereof. FIG. 3A and FIG. 3B show cross-sectional views of a premixed flame formation nozzle extension tube used in the first embodiment, taken along an axial direction thereof. As shown in FIG. 1 and FIG. 2, the diffusion flame formation cone 30 is provided inside of the combustor inner cylinder 20. The pilot fuel supply nozzle 31 which ejects pilot fuel is provided inside of this diffusion flame formation cone 30. The pilot fuel ejected from the pilot fuel supply nozzle 31 reacts with the combustion air and diffusion flames are formed. A swirler 33 which agitates the combustion air is provided around the pilot fuel supply nozzle 31 to sufficiently mix the combustion air with the pilot fuel. The diffusion flame formation cone 30 ejects mixture gas of the combustion air and the pilot fuel toward a combustion chamber 50 (see FIG. 2) and forms diffused combustion flames.

As shown in FIG. 2, premixed flame formation nozzles 40 are arranged between the combustor inner cylinder 20 and the diffusion flame formation cone 30 which forms the diffused combustion flames. Although it is not clear from FIG. 2, the eight premixed flame formation nozzles 40 are arranged annularly around the diffusion flame formation cone 30. It is noted that the number of the premixed flame formation nozzles 40 is not limited to eight but may be appropriately changed according to the specification of a gas turbine combustor. In addition, as shown in FIG. 1 and FIG. 2, premixed flame formation nozzle extension tubes (to be simply referred to as "nozzle extension tubes" hereinafter) 410 serving as premixed flame formation nozzle extension sections are provided at the respective outlets of the premixed flame formation nozzles 40. Premixed gas is ejected through the nozzle extension tubes 410 toward the combustion chamber 50.

As shown in FIG. 1, the outlets of the nozzle extension tubes 410 are sector-shaped. If so shaped, the clearances between the adjacent nozzle extension tubes 410 are kept almost constant and the air thereby flows evenly from the adjacent nozzle extension tubes 410. Therefore, it is possible to suppress high-temperature combustion gas from flowing back to the portions on which the air flows weakly, making it possible to reduce the burning of the portions on which the nozzle extension tubes 410 are adjacent each other. Further, the air flows almost evenly from the portions between the adjacent nozzle extension tubes 410, those between the nozzle extension tubes 410 and the combustor inner cylinder 20, and those between the nozzle extension tubes 410 and the diffusion flame formation cone 30. It is, therefore, possible to suppress flashback caused by uneven air flows and to thereby reduce the burning of the nozzle extension tubes 410 and the like.

In each of the nozzle extension tubes 410, among sides of the nozzle extension tube 410 existing in the diameter direction of the combustor inner cylinder 20, at least a side 411 close to the central axis of the combustor inner cylinder 20 is inclined, at a certain angle α with respect to a plane perpendicular to the central axis of the combustor inner cylinder 20, outward in the diameter direction of the combustor inner cylinder (FIG. 3A). Furthermore, as shown in FIG. 3B, a side 412 of the nozzle extension tube 410 existing in the peripheral direction of the combustor inner cylinder 20 is inclined, at a certain angle β with respect to the plane perpendicular to the central axis of the combustor inner cylinder 20, in the peripheral direction of the combustor inner tube 20.

In this way, by inclining the nozzle extension tube 410 outward in the diameter direction of the combustor inner cylinder 20, it is possible to transform the premixed gas to an outward flow (as indicated by an arrow A shown in FIG. 3A). Further, by inclining the nozzle extension tube 410 in the peripheral direction of the combustor inner cylinder 20, it is possible to give the premixed gas turning in the peripheral direction of the combustor inner cylinder 20 (as indicated by an arrow B shown in FIG. 3B). It is noted that optimum values can be appropriately selected for the angles α and β, respectively according to the specification of the combustor. However, if the both angles are too sharp, the mixture of the premixed gas becomes insufficient, making it difficult to suppress $NO_x$. Conversely, if the both angles are too wide, the premixed gas tends to remain in the combustion chamber and flashback may possibly occur. Therefore, with a view of effectively forming a recycle region to reduce $NO_x$ and decreasing the probability of flashback, it is preferable that both the angles α and β are set within a range of 20 to 50 degrees. In addition, with a view of forming an effective recycle region while minimizing the pressure loss of the nozzle extension tube 410 as much as possible, it is preferable that the both angles α and β are set within a range of 30 to 40 degrees.

The gas turbine combustor will next be described with reference to FIG. 2. The air fed from a compressor (not shown) is introduced into an internal portion of the combustor outer casing 10, passed through the portion between the combustor outer casing 10 and the combustor inner cylinder 20 and then changes its traveling direction by 180 degrees. Thereafter, the air is fed to the premixed flame formation nozzles 40 and the diffusion flame formation nozzle 32 from the backward of the combustor inner cylinder 20 and mixed with main fuel and pilot fuel, respectively.

The compressed air introduced into the diffusion flame formation nozzle 32 is agitated by the swirler 33 provided in the diffusion flame formation nozzle 32 and sufficiently mixed with the pilot fuel ejected from a pilot fuel supply nozzle 31. The mixture gas of the pilot fuel and the compressed air forms diffusion flames and the diffusion flames are ejected from the diffusion flame formation cone 30 toward the combustion chamber 50. The diffusion flames promptly combust premixed gas formed by the premixed flame formation nozzles 40. In addition, the diffusion flames stabilize the combustion of the premixed gas and suppress the flashback of premixed flames and the self ignition of the premixed gas.

The compressed air introduced into the premixed flame formation nozzles 40 is agitated by a swirler 42 provided in each of the premixed flame formation nozzles 40. The main fuel ejected from main fuel supply holes 61 provided in a main fuel supply nozzle 60 is sufficiently mixed with the compressed air to form premixed gas. After the formation of the premixed gas, the premixed gas is ejected from the nozzle extension tubes 410 toward the combustion chamber 50. Since it is necessary to suppress the generation of $NO_x$, the premixed gas contains excessive air relative to the fuel. This premixed gas is promptly ignited by high-temperature combustion gas discharged from the diffusion flames, premixed flames are formed, and high-temperature, high-pressure combustion gas is discharged from the premixed flames.

As described above, at least the side 411 of each nozzle extension tube 410 which is close to the central axis of the combustor inner cylinder 20 is inclined, at the certain angle α with respect to the axial direction of the combustor inner cylinder 20, toward the inner wall of the combustor inner cylinder 20. In addition, the outlet of each nozzle extension tube 410 is inclined at the certain angle β with respect to the axial direction of the combustor inner cylinder 20. Therefore, the combustion gas in the combustion chamber 50 is transformed to a flow which travels spirally around the axis of the combustor inner cylinder 20, so-called an outward turning flow.

Figure 4:
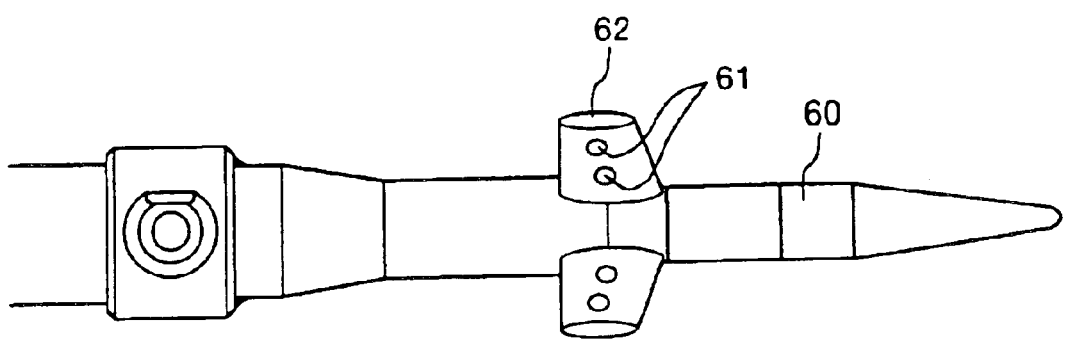
FIG. 4 is a side view of a main fuel supply nozzle.

The main fuel supply nozzle 60 will now be described. FIG. 4 is a side view of the main fuel supply nozzle 60. A plurality of spokes 62 each having a sector-shaped cross section in a peripheral direction thereof is provided around the main fuel supply nozzle 60. In addition, two main fuel supply holes 61 which eject the main fuel are provided on each side surface of the spoke 62, four main fuel supply holes 61 in total are provided on the both side surfaces thereof. It is noted that if the diameter of each main fuel supply hole 61 becomes small, the number of the holes 61 increases. In addition, if the diameter of the main fuel supply hole 61 is set too small, the ejection of the main fuel become unstable. Therefore, although the number of the main fuel supply holes 61 should not be limited to four, it is preferable to set the number so that the diameter of the hole 61 is in a range in which the main fuel can be stably ejected. The number of the main fuel supply holes 61 depends on the diameter of each main fuel supply hole 61, but one to four, preferably two or three main fuel supply holes 61 are provided on each side surface of the spoke 62.

The cross section of this spoke 62 has been conventionally circular-shaped. However, with such a cross-sectional shape, a vortex or the peel-away of the air occurs to the backward of the spoke 62. This causes the generation of flashback. If the cross section has a sector shape as that of the spoke 62 in this embodiment, the air smoothly flows around the spokes 62 and the disturbance of the air can be suppressed in the backward of the spokes 62, thereby making it possible to suppress flashback. This can reduce the burning of the nozzle extension tubes and the like and, therefore, lengthen the life of the combustor. Besides, it is possible to reduce the labor of maintenance.

Figure 5A:
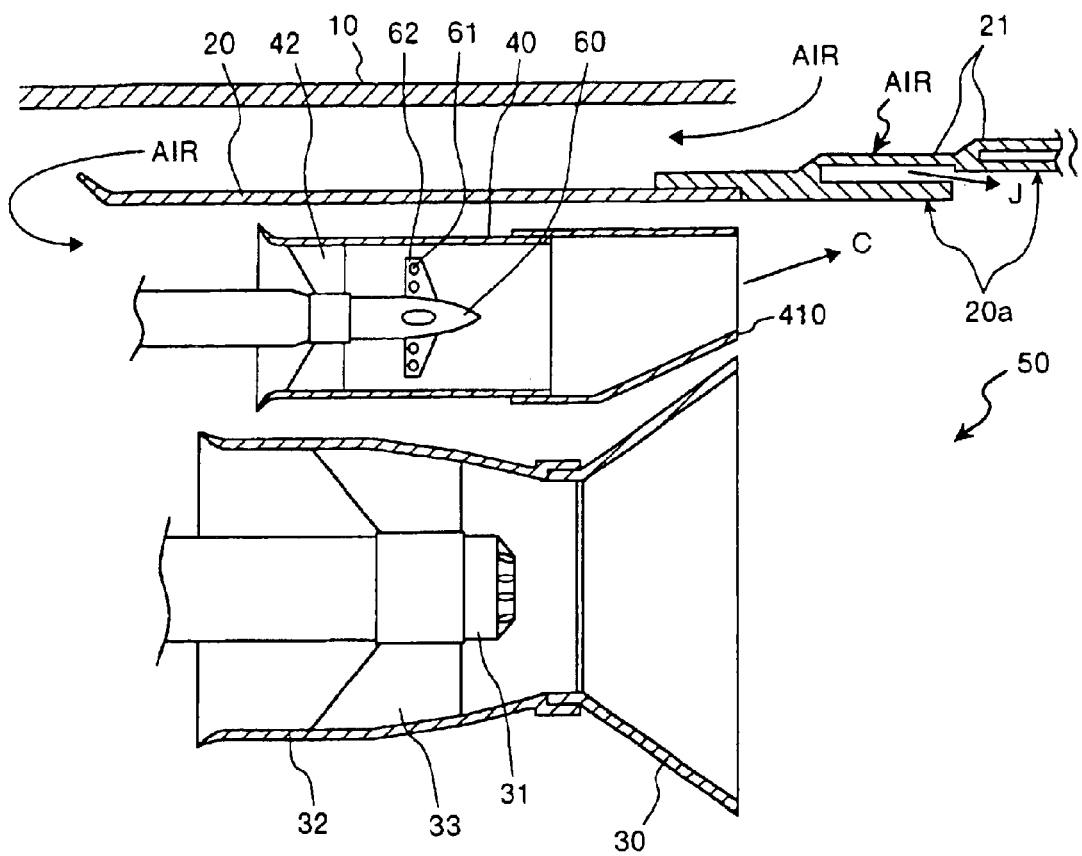
FIG. 5A is a cross-sectional view of a combustor inner cylinder to which a cooling unit is attached, taken along an axial direction thereof.

The cooling of the combustor inner cylinder 20 will next be described. FIG. 5A is a cross-sectional view of the combustor inner cylinder to which a cooling unit is attached, taken in an axial direction thereof. Since the flow of the combustion gas in the gas turbine combustor of the present invention is an outward turning flow, the combustion gas and the premixed flames are struck against the combustor inner cylinder 20a on the combustion chamber 50 side (as indicated by an arrow C shown in FIG. 5A). Therefore, the portion of the combustor inner cylinder 20a on the combustion chamber 50 side against which the combustion gas and the like are struck, becomes high in temperature, which sometimes shorten the life of this portion.

Figure 5B:
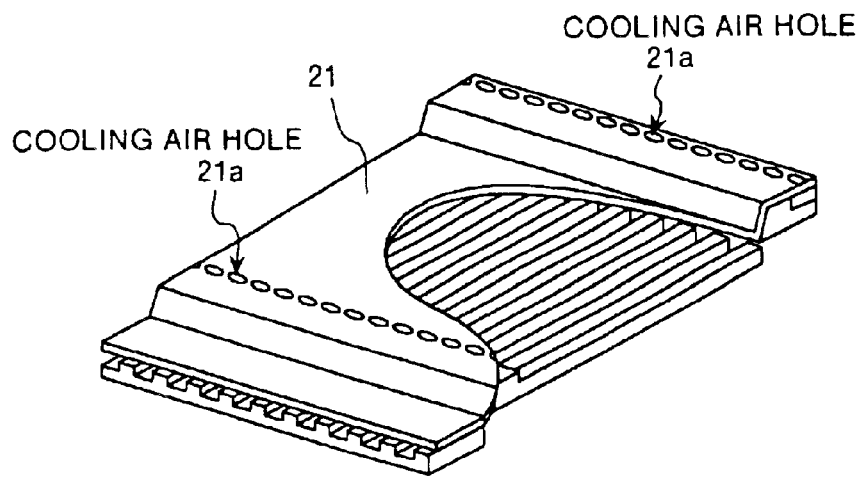
FIG. 5B is a perspective view of the cooling unit.

To avoid this disadvantage, it is preferable that the cooling unit is provided around the combustor inner cylinder 20a on the combustion chamber 50 side so as to remove the heat of the combustion gas and the like. In the example shown in FIG. 5A, the combustor inner cylinder 20a on the combustion chamber 50 side is formed with plate fins 21 to provide the cooling unit. The structure of the plate fin 21 is shown in FIG. 5B. First, the air from the compressor which has been passed through the portion between the combustor outer casing 10 and the combustor inner cylinder 20, flows into each plate fin 21 through cooling air holes 21a (see FIG. 5B) provided in the plate fin 21 on the outer casing 10 side. This air cools the combustor inner cylinder 20a on the combustion chamber 50 side by convection cooling when the air flows into the plate fins 21. In addition, the air that has flowed through the plate fins 21 flows out toward the combustion chamber 50 (as indicated by an arrow J direction shown in FIG. A). By flowing along the surface of the combustion inner cylinder 20a on the combustion chamber 50 side, this air forms a thermal boundary layer in the neighborhood of the surface of the combustion inner cylinder 20a and film-cools the combustor inner cylinder 20 on the combustion chamber 50 side.

It is noted that the cooling unit should not be limited to the plate fins 21 but fins called MT fins may be used or holes may be provided around the combustor inner cylinder 20a on the combustion chamber 50 side so that cooling air is ejected from the holes to thereby film-cool the combustor inner cylinder 20a on the combustion chamber 50 side. According to such a cooling unit, even if the high-temperature combustion gas and the like are struck against the surface of the inner cylinder on the combustion chamber 50 side, the portion is cooled. Therefore, it is possible to suppress a local temperature rise of the combustor inner cylinder 20a on the combustion chamber 50 side. Accordingly, it is possible to form an outward flow more actively, and therefore the mixture of premixed gas can be further accelerated.

Since the combustion gas in the conventional gas turbine combustor forms an inward, twisted turning flow that turns toward the center of the combustor, premixed gas is concentrated in the neighborhood of the center of the combustion chamber 50. As a result, combustion is accelerated on this portion, local high-temperature portions tend to be generated, and the generation of $NO_x$ cannot be suppressed sufficiently. Furthermore, since the recycle region cannot be sufficiently formed in the neighborhood of the center of the combustion chamber 50, the premixed gas becomes unstable to cause oscillating combustion and the like.

According to the gas turbine combustor of the present invention, by contrast, each nozzle extension tube is given certain angle, thereby giving the premixed gas a flow directing outward in the diameter direction of the combustor inner cylinder 20 and turning in the peripheral direction thereof, i.e., an outward turning flow. Therefore, the premixed gas is evenly combusted over the entire regions of the combustion chamber 50 while being sufficiently mixed in the course of the flow of surrounding the diffusion flames. As a result, local high-temperature portions less occur and the generation of $NO_x$ can be suppressed sufficiently. Furthermore, since the recycle region formed on the central portion of the combustor is widened by the outward turning flow, the premixed flames are stably formed and oscillating combustion can be suppressed. In addition, since the premixed gas is combusted over the entire regions of the combustion chamber 50, there hardly remains half-burned premixed gas, making it possible to effectively use the fuel. In this embodiment, the outlet of each nozzle extension tube 410 is simply inclined outward in the diameter direction of the combustor inner cylinder 20 and in the peripheral direction thereof so as to form the outward turning flow, and therefore it is not necessary to specially work the interior of the outlet of each nozzle extension tube 410, facilitating the manufacturing of the combustor.

Figure 6:
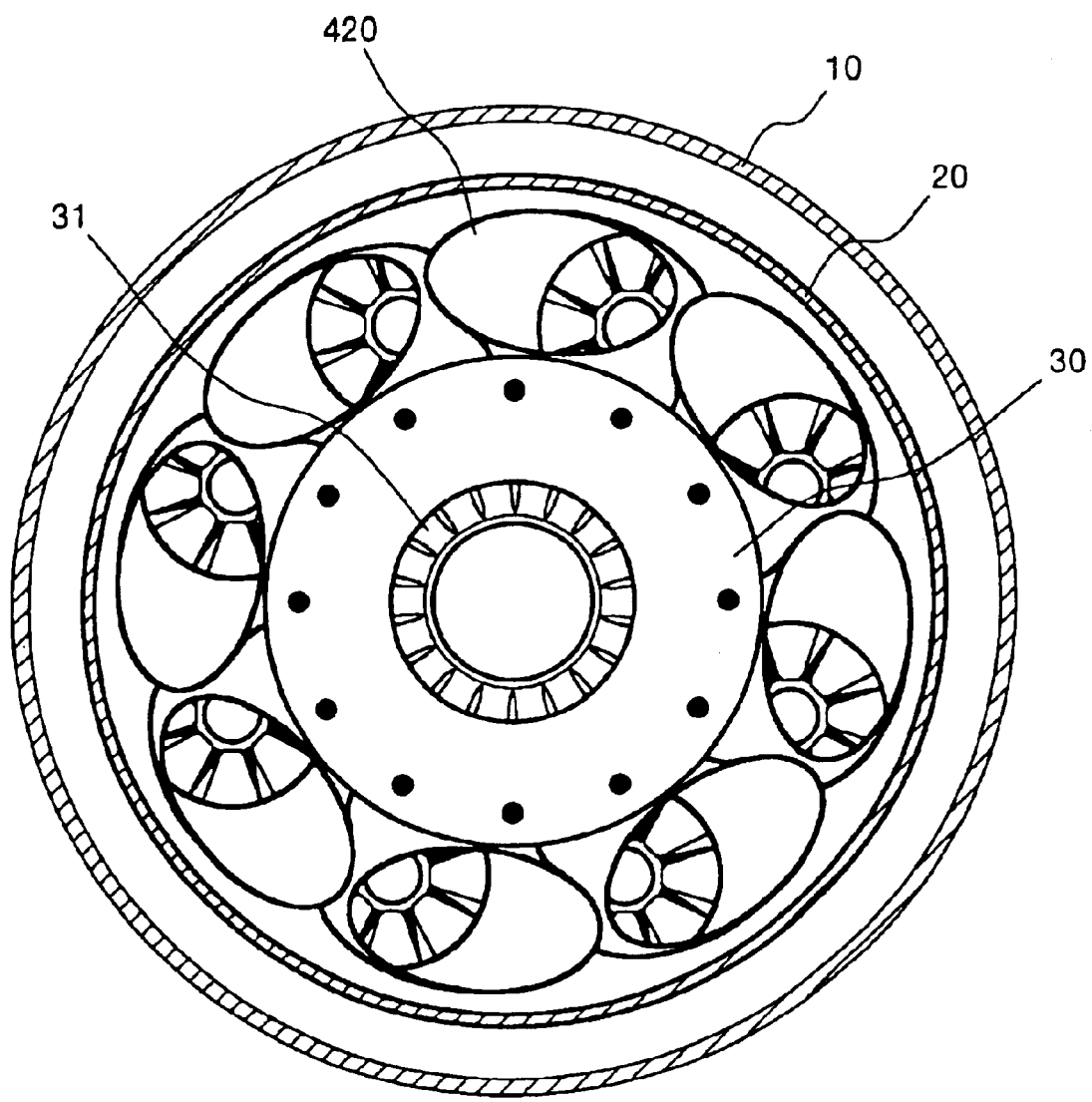
FIG. 6 is a front view of the first modification of the gas turbine combustor according to the first embodiment of the invention.

A first modification of the first embodiment will be described below. FIG. 6 is a front view of the first modification of the gas turbine combustor according to the first embodiment. In the gas turbine combustor according to the first embodiment, the outlet of each nozzle extension tube 410 (see FIG. 1) is sector-shaped. It is also possible to form the outlet of each nozzle extension tube 420 to be elliptic as seen in this modification. Even with the elliptic outlet thereof, the premixed gas ejected from each nozzle extension tube 420 forms an outward turning flow. Therefore, it is possible to combust the gas over the entire combustion chamber (not shown) to decrease local high-temperature portions and to suppress the generation of $NO_x$. In this modification, it is also possible to form the outlet of each nozzle extension tube 420 to be circular.

Figure 7:
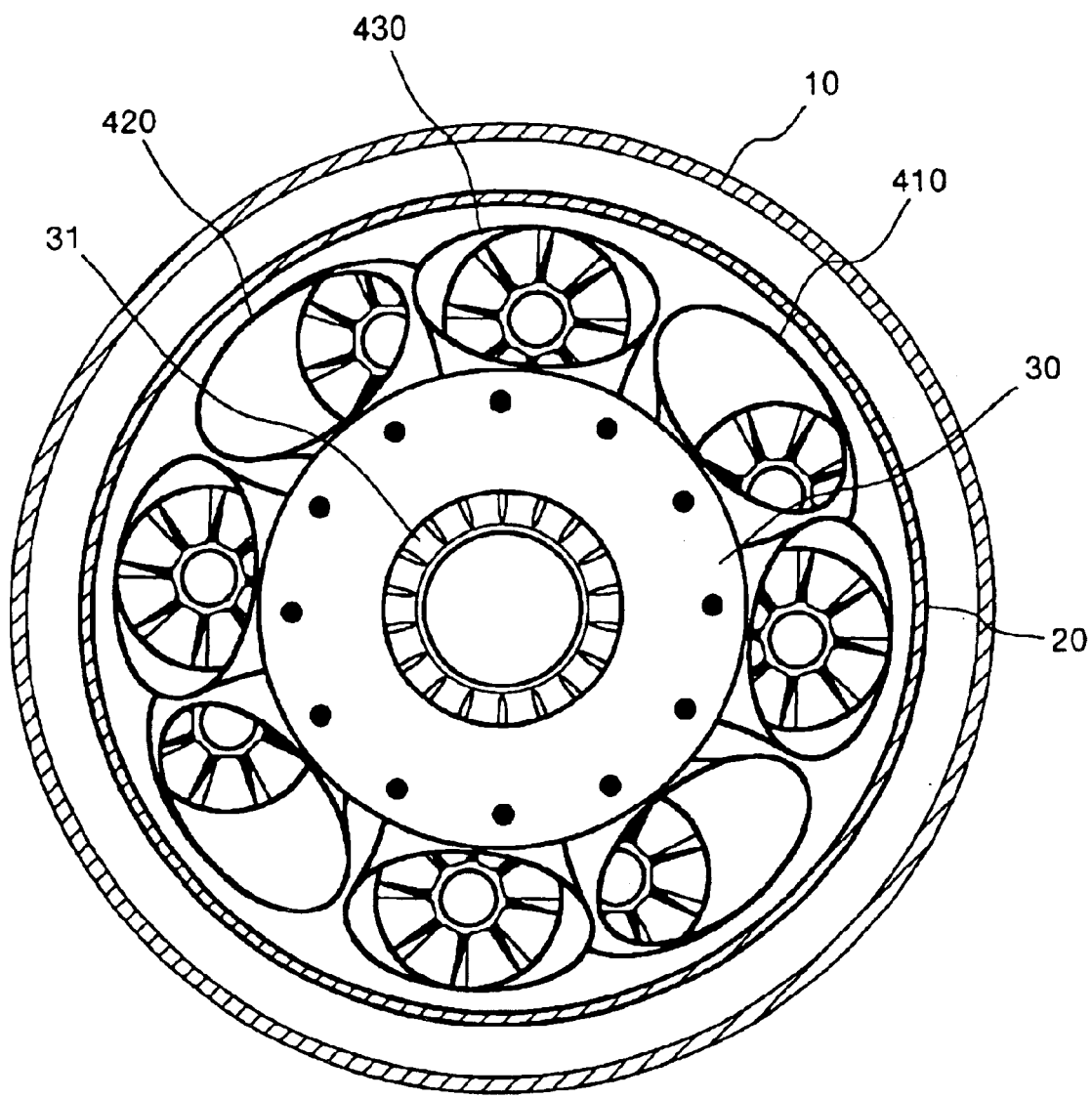
FIG. 7 is a front view of the second modification of the gas turbine combustor according to the first embodiment of the invention.

FIG. 7 is a front view of a second modification of the gas turbine combustor according to the first embodiment. As seen in this modification, nozzle extension tubes 430 directing outward and nozzle extension tubes 420 forming outward turning flows may be alternately arranged. If the nozzle extension tubes are thus arranged, the outward straight flows of the premixed gas formed by the nozzle extension tubes 430 are struck against the outward turning flows of the premixed gas formed by the nozzle extension tubes 420 to advantageously accelerate the mixture of the premixed gas. It is noted that the outlet shape of each of the nozzle extension tubes 430 and 420 is not limited to the elliptical shape shown in FIG. 7 but may be a sector shape or a circular shape as shown in FIG. 1.

Figure 8:
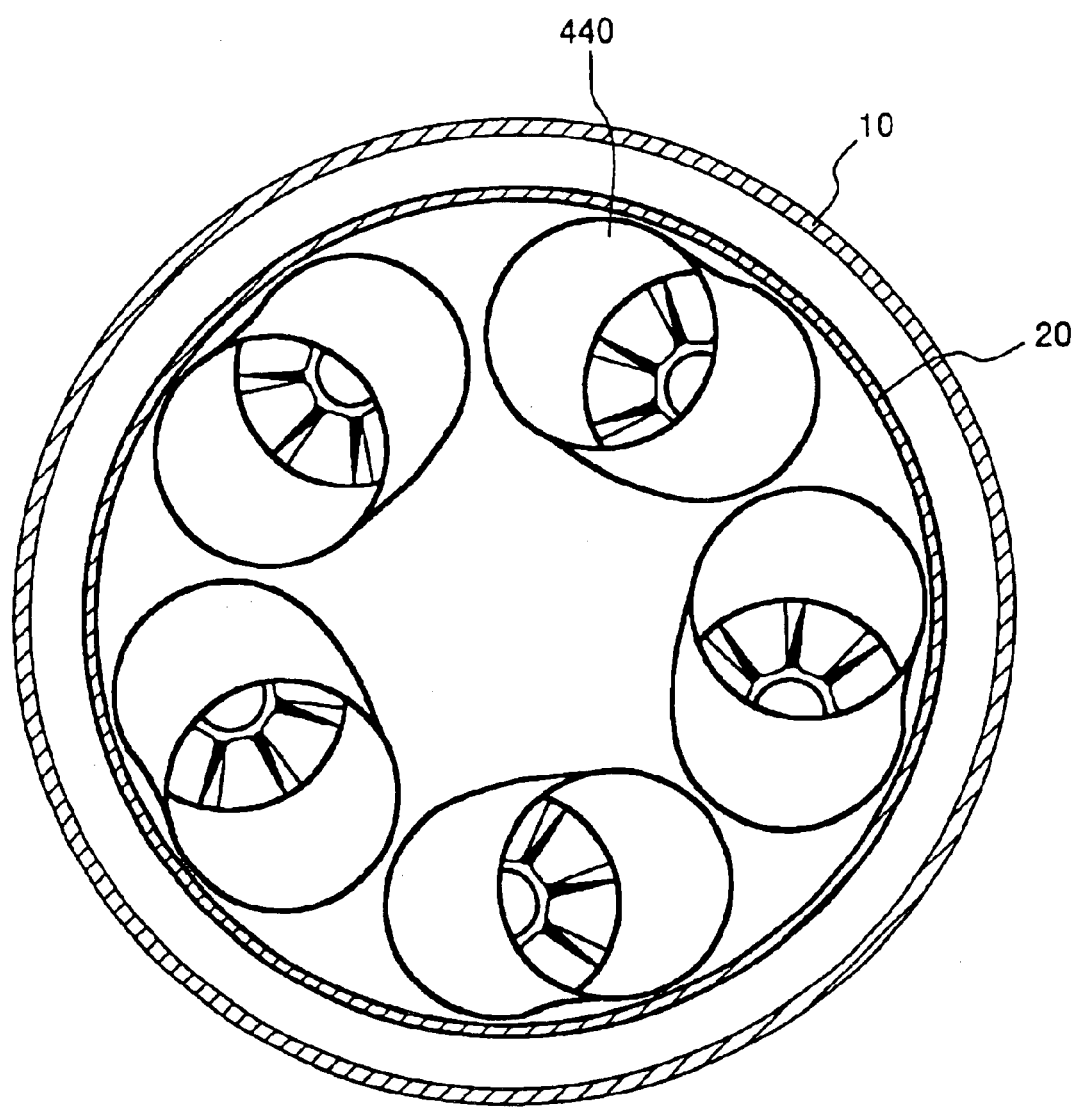
FIG. 8 is a front view of a gas turbine combustor according to a second embodiment of the invention.
Figure 9:
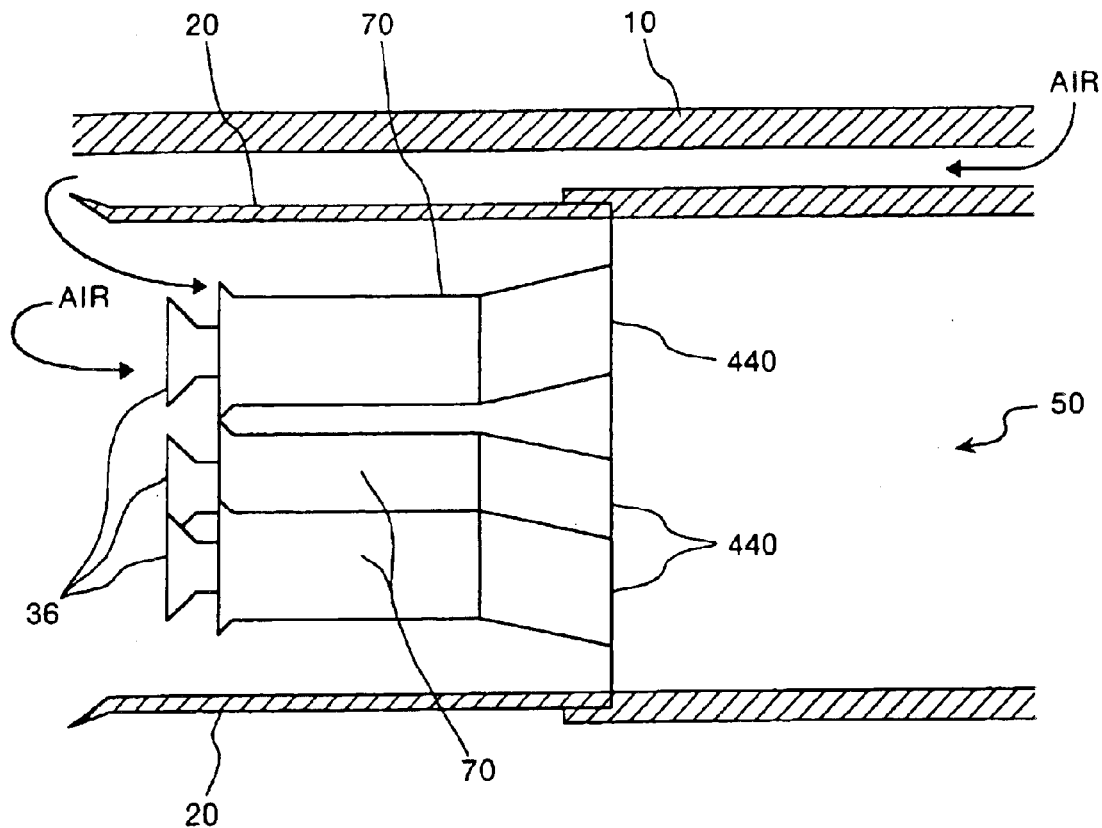
FIG. 9 is a cross-sectional view of the gas turbine combustor shown in FIG. 8, taken along an axial direction thereof.
Figure 10:
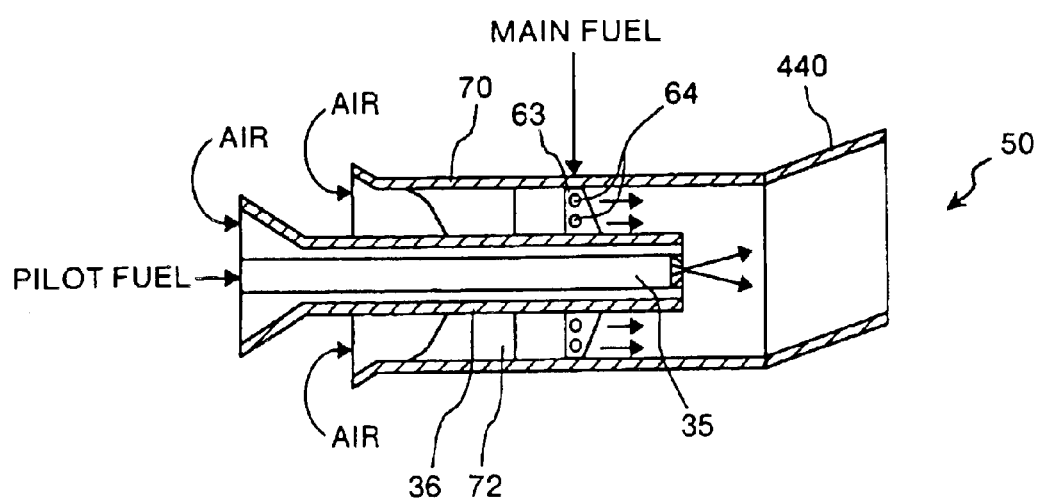
FIG. 10 is a cross-sectional view of a mixed gas formation cylinder used in the second embodiment, taken along an axial direction thereof.

FIG. 8 is a front view of a gas turbine combustor according to a second embodiment of the invention. FIG. 9 is a cross-sectional view of the gas turbine combustor shown in FIG. 8, taken along an axial direction thereof. In addition, FIG. 10 is a cross-sectional view of a mixed gas formation cylinder used in the second embodiment, taken along an axial direction thereof. The gas turbine combustor according to this embodiment provides spokes 63 having main fuel supply holes 64 formed therein which supply main fuel into mixed gas formation cylinders 70 and pilot nozzles 36 and by arranging the mixed gas formation cylinders 70 annularly inside of the combustor inner cylinder 20.

Each of the mixed gas formation cylinders 70 used in this embodiment includes the main fuel supply holes 64 which eject the main fuel into the cylinders 70, respectively and pilot nozzles 36 each having a pilot fuel supply nozzle 35 provided therein as shown in FIG. 10. In addition, a swirler 72 is provided on the air intake port side of each mixed gas formation cylinder 70 to turn compressed air for combustion and sufficiently mix the compressed air with the main fuel and the pilot fuel.

A nozzle extension tube 440 which serves as a mixed gas ejection extension section is provided on the outlet side of each of the mixed gas formation cylinder 70. This nozzle extension tube 440 ejects gas in which the combustion compressed air is mixed with the main fuel and the pilot fuel, toward a combustion chamber 50. The outlet of each nozzle extension tube 440 is circular-shaped and inclined outward in the diameter direction of the combustor inner cylinder 20. The nozzle extension tube 440 is also inclined in the peripheral direction of the combustion inner cylinder 20. It is noted that the outlet shape of each nozzle extension tube 440 is not limited to the circular shape but may be the sector shape or the elliptic shape as shown in the first embodiment. The same thing is true hereinafter.

In the gas turbine combustor in this embodiment, five mixed gas formation cylinders 70 each having the nozzle extension tube 440 provided on the outlet thereof are arranged annularly inside of the combustor inner cylinder 20 (see FIG. 8 and FIG. 9). It is noted that the number of the mixed gas formation cylinders 70 is not limited to five but may be appropriately changed according to the specification of a gas turbine combustor and the like.

The gas turbine combustor in this embodiment will be described with reference to FIG. 9. The compressed air for combustion fed from a compressor (not shown) is introduced into a combustor outer casing 10, passed through the portion between the combustor outer casing 10 and the combustor inner cylinder 20 and then changes its traveling direction by 180 degrees. The combustion compressed air is introduced into the pilot nozzles 36 and the mixed air formation cylinders 70 from the backward of the mixed gas formation cylinders 70.

The gas turbine combustor will be described with reference to FIG. 10. The compressed air introduced into each pilot nozzle 36 is sufficiently mixed with the pilot fuel ejected from the pilot fuel supply nozzle 35. In addition, after the air introduced into each mixed gas formation tube 70 is agitated by the swirler 72 provided in each mixed gas formation cylinder 70, the air is sufficiently mixed with the main fuel ejected from the main fuel supply holes 64 and premixed gas is formed. It is noted that the air is excess relative to the fuel in the premixed gas so as to suppress the generation of $NO_x$. In addition, from the viewpoint of suppressing flashback, the spokes each having a sector-shaped cross section described in the first embodiment are preferably used as the spokes 63 provided with the main fuel supply holes 64. If using them, it is possible to effectively suppress the flashback and to thereby suppress the burning of the nozzle extension tubes 440 and the like. In addition, since the combustion is stabilized, it is also possible to suppress oscillating combustion.

The mixed gas and the premixed gas formed out of the pilot fuel and the compressed air are ejected through the nozzle extension tubes 440 toward the combustion chamber 50. The mixed gas of the pilot fuel and the compressed air ejected toward the combustion chamber 50 forms diffusion flames, and high-temperature combustion gas generated from the diffusion flames promptly combusts the premixed gas. The high-temperature combustion gas also stabilizes the combustion of the premixed gas to thereby suppress the generation of the flashback of the premixed flames and the self ignition of the premixed gas. The combusted premixed gas forms premixed flames, and high-temperature, high-pressure combustion gas is discharged from the premixed flames.

The mixed gas and the premixed gas formed by mixing the pilot fuel with the compressed air are transformed to outward turning flows directing outward in the diameter direction of the combustor inner cylinder 20 and turning in the peripheral direction thereof by the nozzle extension tubes 440, and the flows pass into the combustion chamber 50. The outward turning flows enable the premixed gas and the like to be combusted over the entire regions of the combustor while sufficiently mixing the premixed gas and the like. Therefore, local high-temperature portions are reduced and the generation of $NO_x$ is suppressed. Further, because of the outward turning flows, pressure is high in the neighborhood of the inner wall of the combustion chamber 50 and low in the neighborhood of the center thereof. As a result, a circulating flow is generated between the neighborhood of the inner wall and the neighborhood of the center, thereby forming a recycle region. Consequently, the flames are stabilized and oscillating combustion is decreased, making it possible to ensure the stable operation of the combustor. As described in the first embodiment, a cooling unit may be provided at the combustor inner cylinder on the combustion chamber 50 side so as to cool the portion of the combustor inner cylinder against which flames formed by combusting high-temperature combustion gas and mixed gas are struck. By doing so, it is possible to form the outward turning flows more actively. Therefore, the fuel is mixed with the air more sufficiently and evenly combusted, making it possible to suppress the generation of local high-temperature portions. As a result, the generation of $NO_x$ can be further suppressed.

Figure 11:
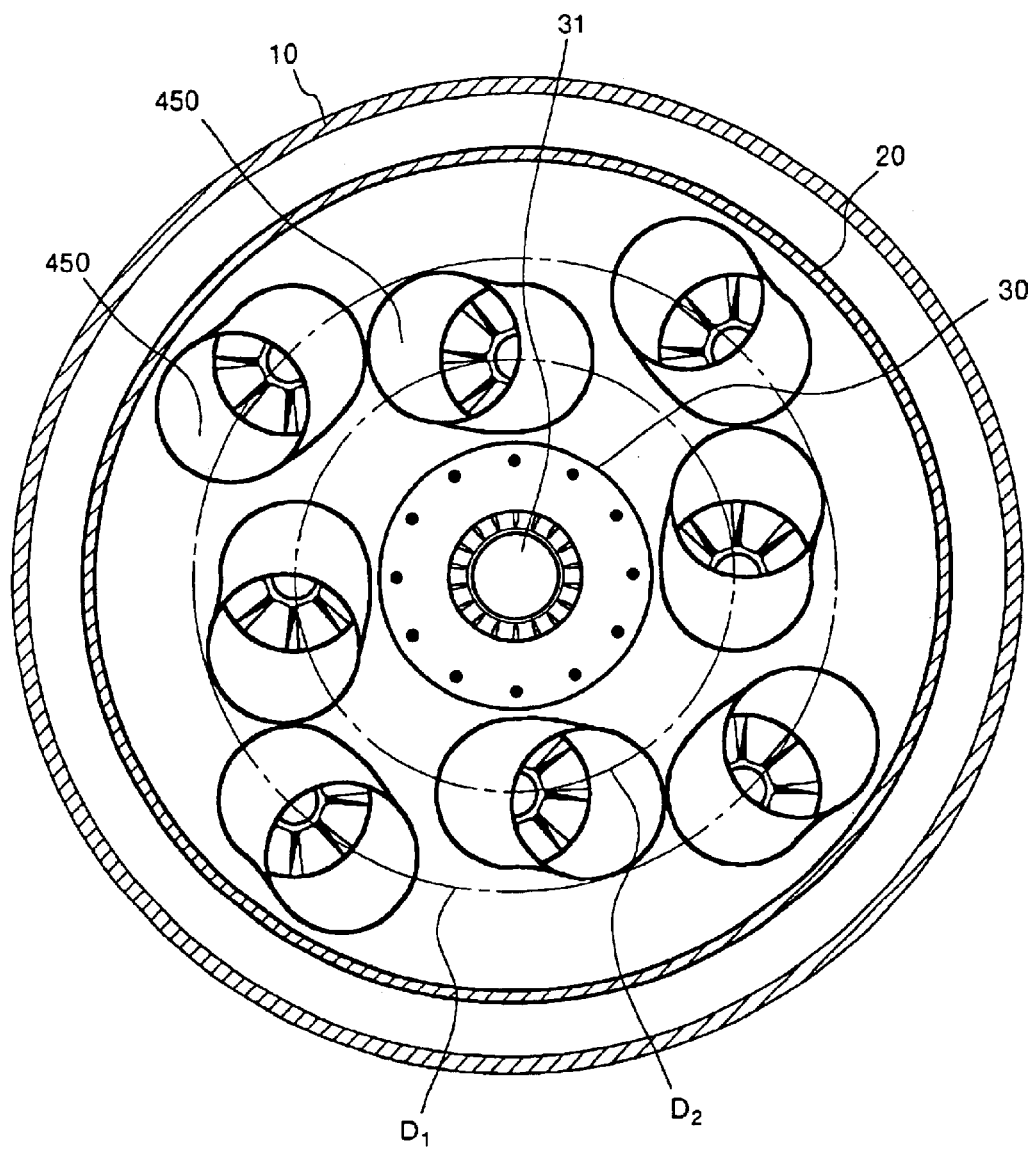
FIG. 11 is a front view of a gas turbine combustor according to a third embodiment of the invention.

FIG. 11 is a front view of a gas turbine combustor according to a third embodiment of this invention. The gas turbine combustor according to this embodiment has a plurality of premix nozzles arranged on pitch circles $D_1$ and $D_2$ ($D_1 > D_2$) which exist on a plane perpendicular to the axial direction of the combustor inner cylinder 20 and which differ in magnitude from each other.

As shown in FIG. 11, in the gas turbine combustor according to this embodiment, the diffusion flame formation cone 30 which forms diffused combustion flames is provided inside of the combustor inner cylinder 20 and a plurality of premixed flame formation nozzles (not shown) are arranged on at least two pitch circles having different magnitudes around this diffusion flame formation cone 30. Four premixed flame formation nozzles are arranged on each of the pitch circles $D_1$ and $D_2$. It is noted that the number of premixed flame formation nozzles is not limited to four.

Each of the premixed flame formation nozzles has a main fuel supply nozzle which ejects main fuel, provided therein. In addition, a swirler is provided on the air intake port side of each of the premixed flame formation nozzles. Combustion air is given turning by this swirler and sufficiently mixed with the main fuel. Further, a nozzle extension tube 450 is provided on the outlet side of each premixed flame formation nozzle to eject gas formed by mixing the combustion compressed air with the main fuel, toward a combustion chamber (not shown). The outlet of each nozzle extension tube 450 is circular-shaped and inclined outward in the diameter direction of the combustor inner cylinder 20. At the same time, the nozzle extension tube 450 is inclined in the peripheral direction of the combustion inner cylinder 20.

Premixed gas ejected from the premixed flame formation nozzles is ejected toward the combustion chamber through the nozzle extension tubes 450, respectively. The premixed gas ejected toward the combustion chamber is transformed to outward turning flows by the nozzle extension tubes 450 and pass spirally within the combustion chamber. In the gas turbine combustor according to this embodiment, since the premixed flame formation nozzles are arranged on each of the two pitch circles $D_1$ and $D_2$, outward turning flows corresponding to the respective premixed flame formation nozzle groups provided on the pitch circles $D_1$ and $D_2$ are generated. These two outward turning flows cause circulating flows to be generated between the neighborhood of the inner wall of the combustion chamber and the neighborhood of the center thereof and between the outward turning flows formed by the outside premixed flame formation nozzle group and the outward turning flows formed by the inside premixed flame formation nozzle group, respectively, thereby sufficiently mixing the premixed gas. As a result, local high-temperature portions are reduced and the generation of $NO_x$ can be suppressed. In addition, the two recycle regions make the premixed flames more stable to make it possible to reduce oscillating combustion and the like.

Furthermore, in the gas turbine combustor according to this embodiment, since the premixed flame formation nozzles are arranged on each of the two pitch circles $D_1$ and $D_2$, it is possible to appropriately select premixed flame formation nozzle groups to be used according to load. Therefore, it is possible to perform a rarefied combustion operation at an optimum fuel-to-air ratio with partial load through full load, making it possible to suppress the generation of $NO_x$ in all load regions.

Figure 12:
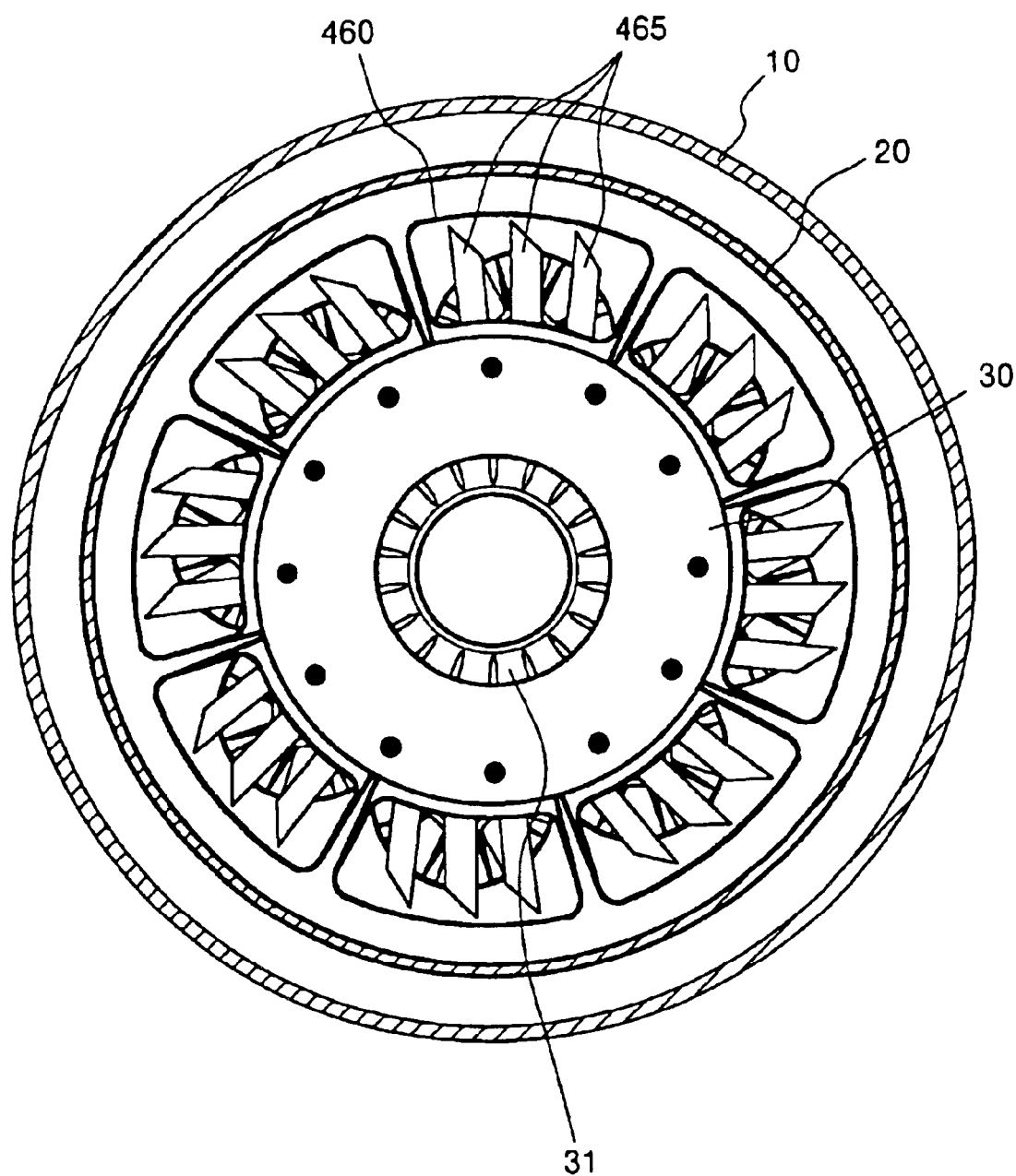
FIG. 12 is a front view of a gas turbine combustor according to a fourth embodiment of the invention.
Figure 13:
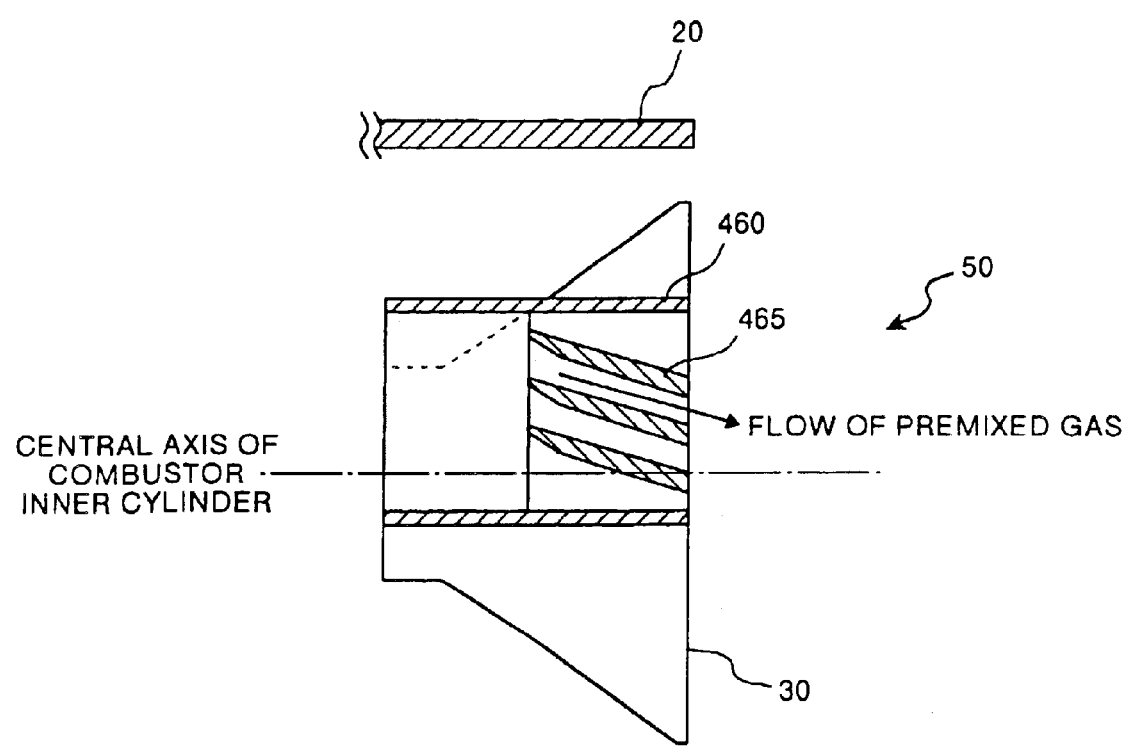
FIG. 13 is a cross-sectional view of a nozzle extension tube using the gas turbine combustor according to the fourth embodiment.

FIG. 12 is a front view of a gas turbine combustor according to a fourth embodiment of this invention. FIG. 13 is a cross-sectional view of a nozzle extension tube used in the gas turbine combustor according to the fourth embodiment, taken along an axial direction thereof. This gas turbine combustor adjusts the direction of premixed gas by fins provided inside of nozzle extension tubes 460.

The gas turbine combustor according to this embodiment differs from the gas turbine combustor according to the first embodiment in that the fins inclined in a certain direction are used as one of units which form outward turning flows. As shown in FIG. 12 and FIG. 13, the outlet of each of the nozzle extension tubes 460 is inclined toward the inner wall of the combustor inner cylinder 20 and this inclination gives an outward flow to the premixed gas. In addition, fins 465 each of which gives the premixed gas turning in the peripheral direction of the combustor inner cylinder 20 are provided in the neighborhood of the outlet of the nozzle extension tube 460. The number of fins 465 can be appropriately changed. It is noted that the fins 465 may be attached to the inner wall of the combustor inner cylinder 20. In this case, the fins 465 are disposed closer to a combustion chamber (not shown) and exposed to high temperature. Therefore, it is preferable that the fins 465 are cooled by a cooling unit such as a film cooling unit or a convection cooling unit.

In the gas turbine combustor according to this embodiment, the fins 465 are provided at the outlet of each nozzle extension tubes 460 and the outlet of each nozzle extension tube 460 is inclined outward in the diameter direction of the combustor inner cylinder 20. Therefore, the premixed gas ejected from the nozzle extension tubes 460 is transformed to flows traveling spirally around the axis of the combustor inner cylinder 20, so-called outward turning flows. The outward turning flows allow the premixed gas to be sufficiently mixed, thereby making it possible to reduce local high-temperature portions and to suppress the generation of $NO_x$. Further, pressure is high in the neighborhood of the inner wall of the combustion chamber 50 and low in the neighborhood of the center thereof because of the outward turning flows. As a result, a large circulating flow is generated between the neighborhood of the inner wall of the combustion chamber 50 and the neighborhood of the center thereof to widen a recycle region. This stabilizes the combustion of the premixed gas. It is noted that the same advantage can be attained if the fins 465 are attached to the inner wall of the combustion inner cylinder 20.

Figure 14:
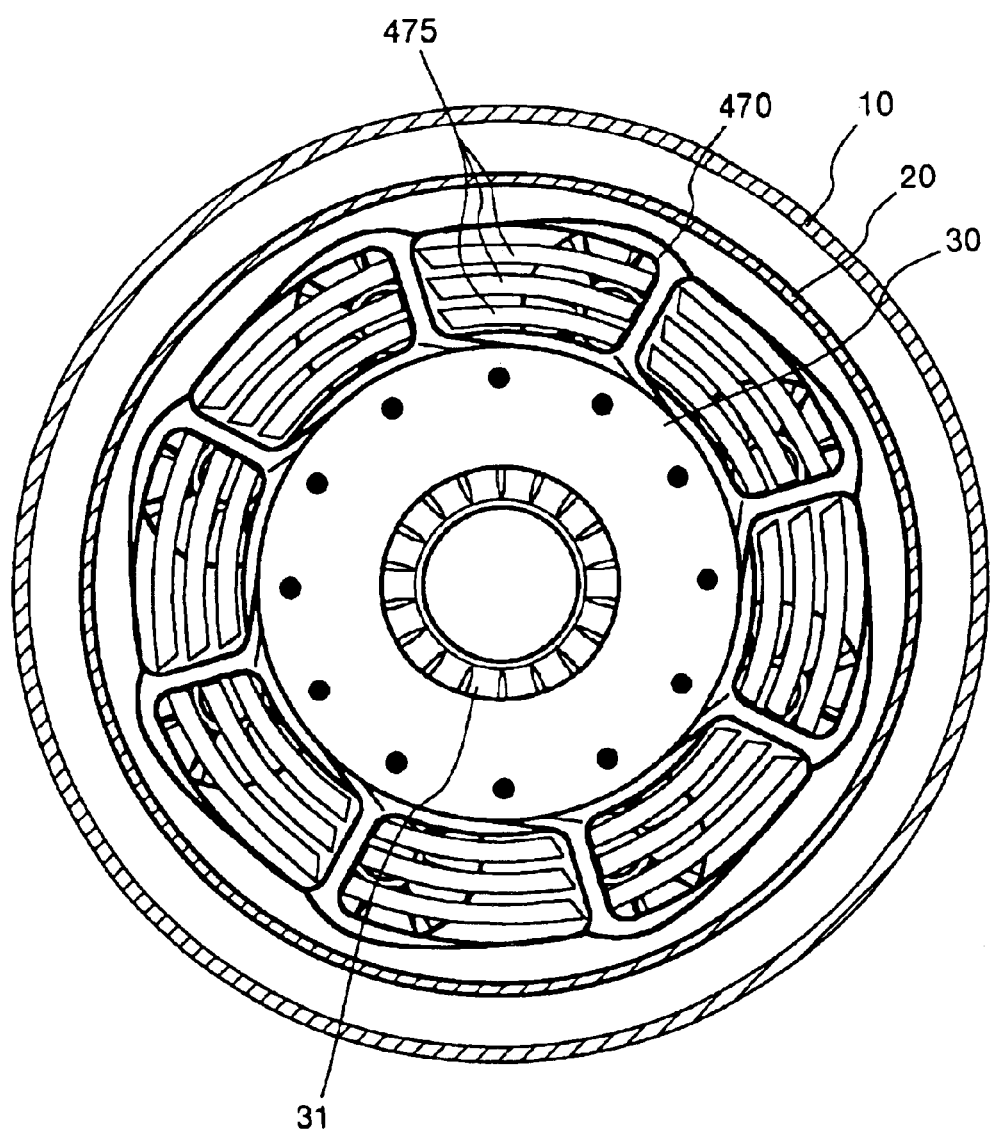
FIG. 14 is a front view of a gas turbine combustor according to the modification of the fourth embodiment.
Figure 15:
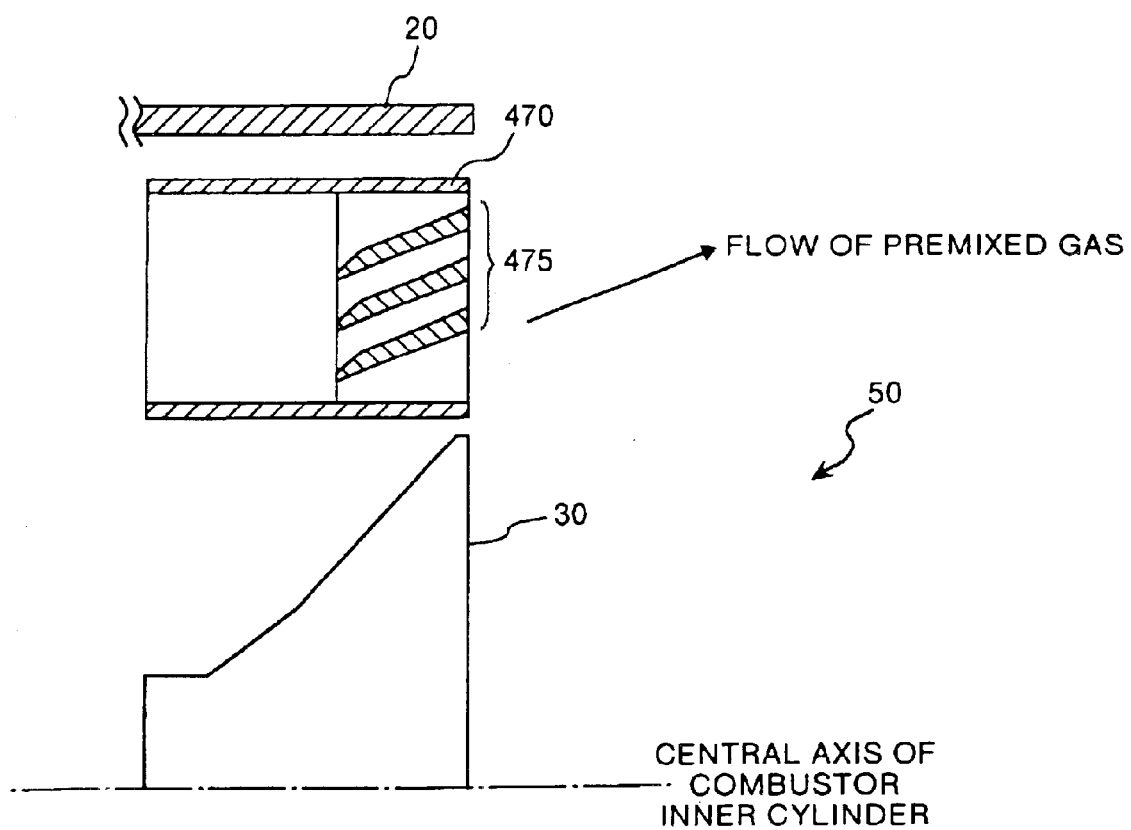
FIG. 15 is a cross-sectional view of a nozzle extension tube used in the fourth embodiment.
Figure 16:
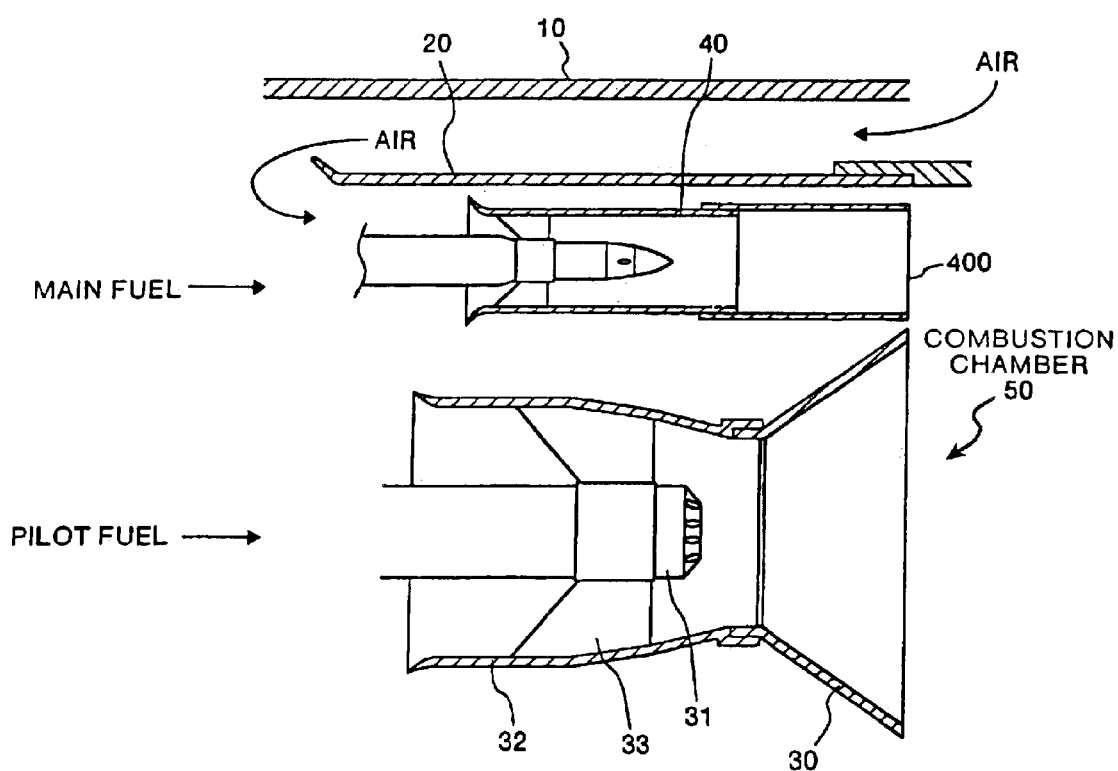
FIG. 16 is a front view which shows one example of a premix type gas turbine combustor.

FIG. 14 is a front view of a gas turbine combustor according to a modification of the fourth embodiment. FIG. 15 is a cross-sectional view of a premixed flame formation nozzle extension tube used in the fourth embodiment, taken along an axial direction thereof. The above-stated gas turbine combustor gives turning to the premixed gas by the fins 465, but the gas turbine combustor according to this modification gives outward flows to premixed gas by fins 475 and turning thereto by inclining each nozzle extension tube.

In the gas turbine combustor according to this modification, the fins 475 are provided at the outlet of each nozzle extension tube 470, and the outlet of each nozzle extension tube 470 is inclined so as to give turning to the premixed gas in the peripheral direction of the combustor inner cylinder 20. In addition, the fins 475 are inclined outward in the diameter direction of the combustor inner cylinder 20 to thereby give flows in the diameter direction thereof to the premixed gas. It is noted that the number of the fins 475 can be appropriately changed.

The premixed gas ejected from the nozzle extension tubes 470 is transformed to flows traveling spirally around the axis of the combustor inner cylinder 20, i.e., outward turning flows by the inclination of the nozzle extension tube 470 and the fins 475. The outward turning flows cause the premixed gas to be sufficiently mixed, making it possible to reduce local high-temperature portions and to suppress the generation of $NO_x$. Further, pressure is high in the neighborhood of the inner wall of a combustion chamber 50 and low in the neighborhood of the center thereof by the outward turning flows. As a result, a circulating flow is generated between the inner wall of the combustion chamber 50 and the center thereof to widen a recycle region. Since this recycle region becomes larger than that when the premixed gas forms inward turning flows, premixed flames are formed in a stable manner. As a result, oscillating combustion and the like are decreased, making it possible to perform operation more stably than the conventional combustor.

According to the gas turbine combustor as one aspect of this invention, the premixed flame formation nozzle extension section which forms a flow of premixed gas turning in a peripheral direction of the combustor inner cylinder while being directing outward in a diameter direction of the combustor inner cylinder is provided at the outlet of the premixed flame formation nozzle which forms premixed flames out of premixed gas formed by mixing the main fuel with the air. Since this premixed flame formation nozzle extension section gives the premixed gas a flow directing toward the inner wall surface of the combustor inner cylinder and turning, the premixed gas is sufficiently mixed in the process of flowing spirally around the diffusion flames. Because of this mixing action, local high-temperature portions are hardly generated and the generation of $NO_x$ can be sufficiently suppressed. In addition, since a recycle region formed in the neighborhood of the center of the combustor is widened, the premixed flames are stably formed and stable operation can be performed.

According to the gas turbine combustor of another aspect of this invention, the premixed flame formation nozzle extension section is inclined outward in the diameter direction of the combustor inner cylinder and in the peripheral direction thereof with respect to the axial direction of the combustor inner cylinder so as to give premixed gas a flow directing toward the inner wall surface of the combustor inner cylinder and turning. Therefore, the premixed gas ejected from this premixed flame formation nozzle extension section is sufficiently mixed and the combustion of the premixed gas evenly, sufficiently progresses over the axial direction of the combustion chamber in the process of flowing outward and spirally within the combustor chamber. Because of this action, local high-temperature portions are hardly generated and the generation of $NO_x$ can be sufficiently suppressed. Further, since a recycle region formed in the neighborhood of the center of the combustion chamber is widened, premixed flames are stably formed and stable operation can be performed. Furthermore, because of the simple structure of inclining the outlet of the premixed flame formation nozzle extension section, the gas turbine combust or can be easily manufactured and the durability thereof improves.

According to the gas turbine combustor of still another aspect of this invention, mixed gas and premixed gas of the pilot fuel and the compressed air are formed in the mixed gas formation cylinder and are ejected from the mixed gas ejection extension section inclined outward in the diameter direction of the combustor inner cylinder and in the peripheral direction thereof with respect to the axial direction of the combustor inner cylinder. Therefore, the premixed gas and the mixed gas become outward turning flows and pass spirally within the combustion chamber. Therefore, pressure is high in the neighborhood of the inner wall of the combustion chamber and low in the neighborhood of the center thereof. As a result, the combustion of the premixed gas progresses while the premixed gas is being sufficiently mixed. Therefore, local high-temperature portions are reduced and the generation of $NO_x$ can be sufficiently suppressed. In addition, since a recycle region formed between the neighborhood of the inner wall of the combustion chamber and the neighborhood of the center thereof is widened to thereby stabilize flames and suppress oscillating combustion and the like, making it possible to perform stable operation.

Furthermore, the combust or inner cylinder cooling unit is provided on a portion on which at least premixed flames formed by the premixed flame formation nozzle or flames formed by the gas ejected from the mixed gas formation cylinder are struck against an inner periphery of the combustor inner cylinder. Therefore, it is possible to suppress the temperature of the combustor inner cylinder from rising. It is thus possible to create an outward turning flow more actively without shortening the life of the combustor inner cylinder. As a result, it is possible to sufficiently suppress the generation of $NO_x$. In addition, since it is possible to further widen a recycle region, it is possible to ensure more stable operation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine combustor comprising:
    a combustor inner cylinder;
    a mixed gas formation cylinder which has a nozzle ejecting pilot fuel and a nozzle ejecting main fuel, and which is disposed inside of the mixed gas formation cylinder; and
    a mixed gas ejection extension section which is disposed at an outlet of the mixed gas formation cylinder while being inclined outward in a diameter direction of the combustor inner cylinder and in a peripheral direction of the combustor inner cylinder with respect to an axial direction of the combustor inner cylinder, and which ejects gas formed by mixing the pilot fuel with air and premixed gas formed by mixing the main fuel with the air.

2. The gas turbine combustor according to claim 1, further comprising a combustor inner cylinder cooling unit which is provided on a portion on which at least premixed flames formed by a premixed flame formation nozzle or flames formed by the gas ejected from the mixed gas formation cylinder are struck against an inner periphery of the combustor inner cylinder.

* * * * *